July 28, 1964 P. R. HASKELL ETAL 3,142,196
TRANSMISSION FOR A CHAIN SAW
Filed May 26, 1961 4 Sheets-Sheet 3

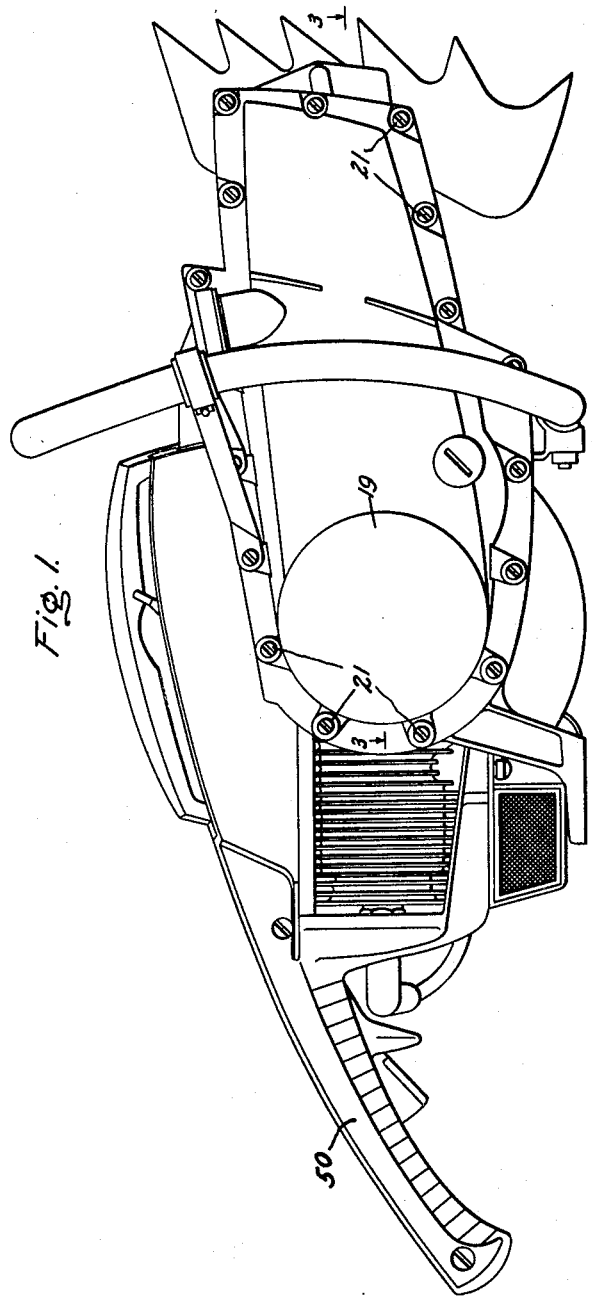

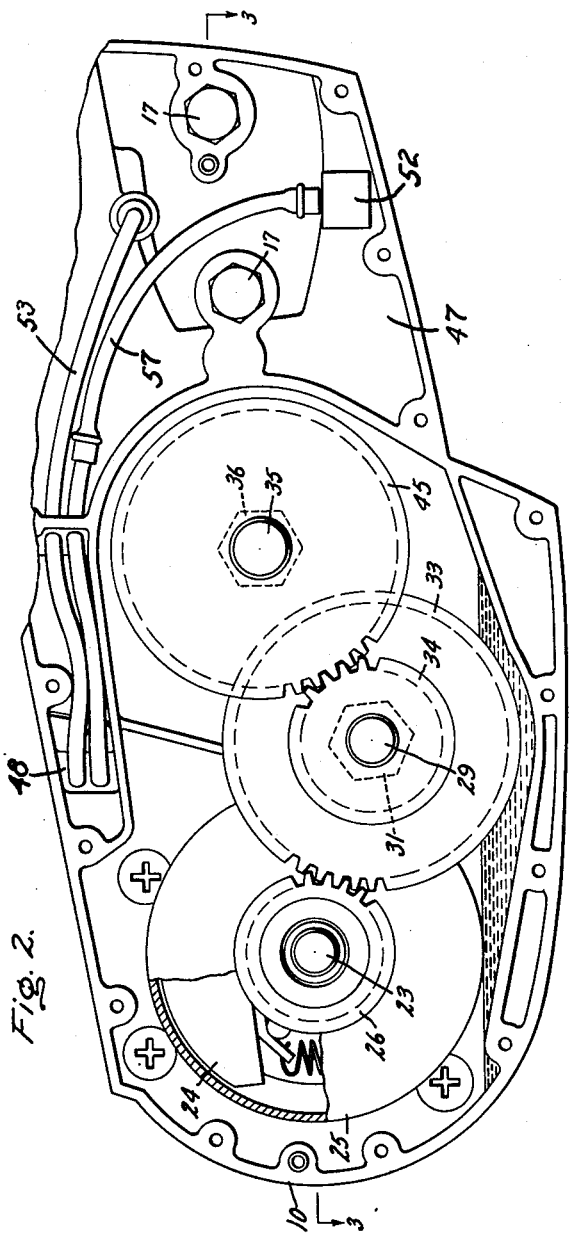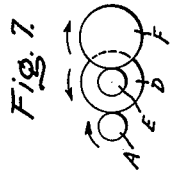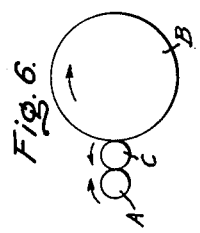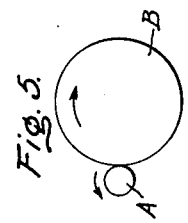

Inventors:
Philip R. Haskell,
Robert K. Shaffer,
by John H. Lewis Jr.
John W. Phipps
Attorneys.

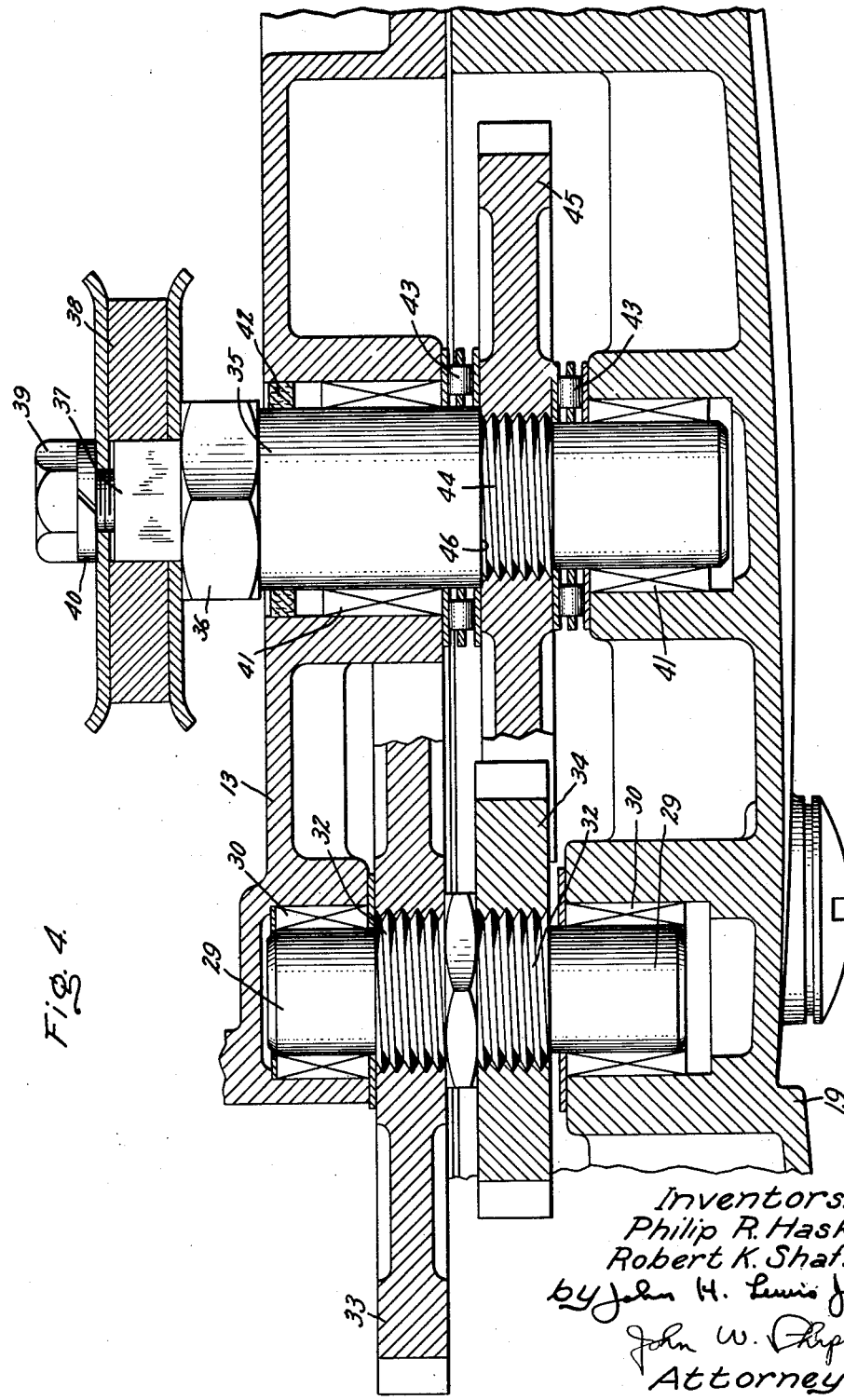

United States Patent Office 3,142,196
Patented July 28, 1964

3,142,196
TRANSMISSION FOR A CHAIN SAW
Philip R. Haskell, Flossmoor, and Robert K. Shaffer, Hazel Crest, Ill., assignors to Remington Arms Company, Inc., Bridgeport, Conn., a corporation of Delaware
Filed May 26, 1961, Ser. No. 112,839
3 Claims. (Cl. 74—414)

This invention relates to a transmission for a chain saw and has particular reference to a reduction gear drive chain saw of a low, compact profile.

One of the objects of this invention was to produce a gear train which could be housed in a case which harmonized in appearance with the type of chain saw which forms the subject of Design Patent No. 190,156, issued April 18, 1961, to Gordon W. Florian.

Another objective was to produce the desired ratio of gear reduction with a minimum of mass in the rotating system and to provide a construction which facilitates the assembly of the gear members and permits the selection of several different gear ratios, with a minimum of parts.

The exact nature of the invention as well as other objects and advantages thereof will become more apparent from consideration of the following specification referring to the attached drawings in which:

FIG. 1 is a right side elevation of a chain saw incorporating the invention in its normal operating position;

FIG. 2 is an enlarged right side elevation of a portion of FIG. 1 with the cover of the gear case removed;

FIG. 4 is an enlarged horizontal sectional view through the intermediate shaft and output shaft portion of FIG. 3; and FIGS. 5, 6 and 7 are schematic drawings illustrating the advantages of the double step gear reduction which applicants prefer.

Figure 3:
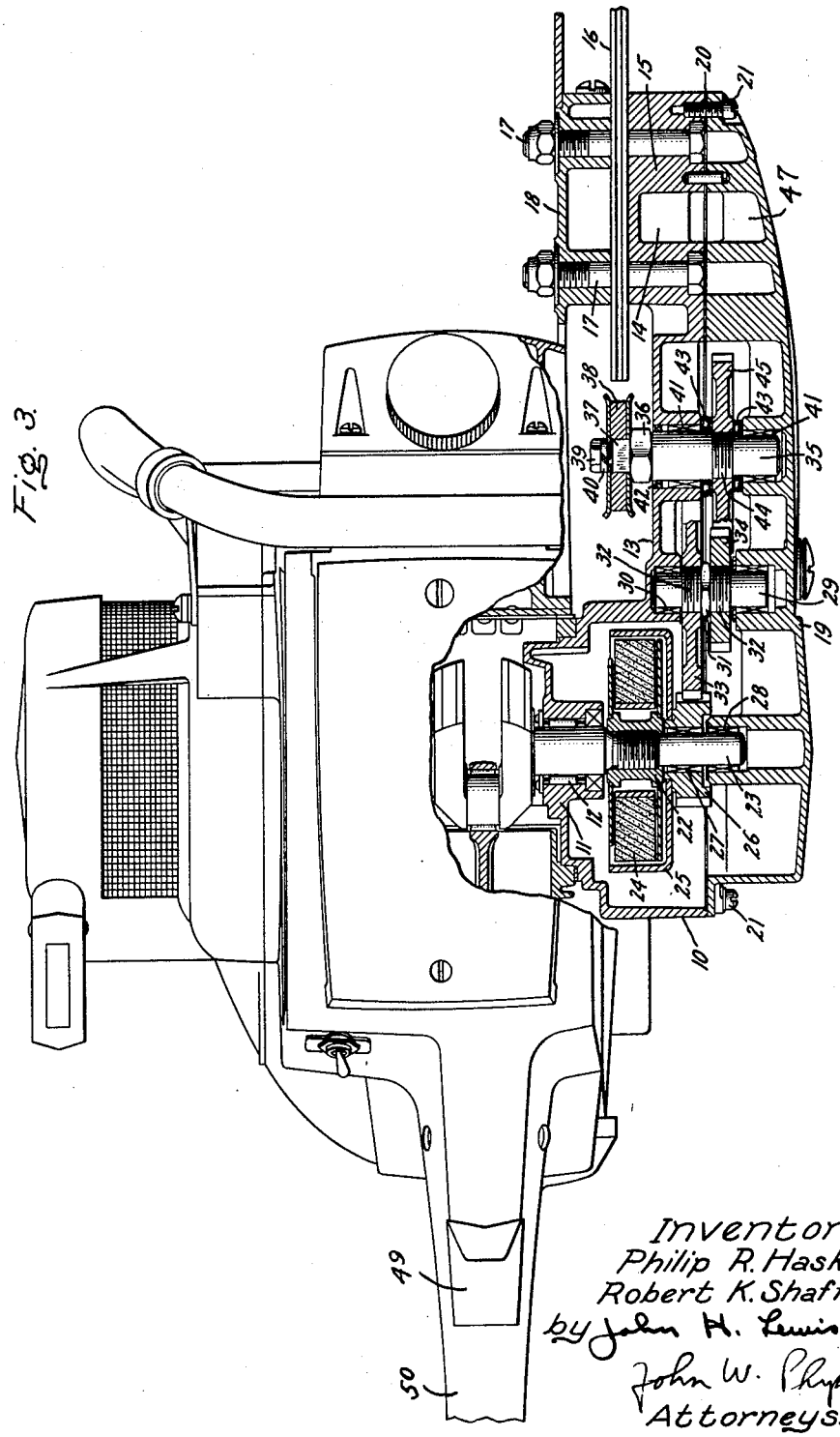
FIG. 3 is a generally horizontal sectional view on the line 3—3 of FIGS. 1 and 2.

Referring to the drawings by characters of reference, we have illustrated a chain saw comprising a single cylinder two-stroke cycle internal combustion engine having a flywheel/fan assembly and a recoiling type pull starter on the left hand end of the crank shaft and a centrifugal clutch mechanism on the right hand or output end of the crank shaft.

The mechanism thus far described is common to a line of direct drive saws as well as to the present invention of a gear train saw, and since the engine is designed for direct drive service also it is timed for clockwise rotation as the engine is viewed facing the output clutch.

The present invention is concerned with the transmission which is enclosed in a two-part die cast casing which also functions as a side plate of the engine.

The gear case is a die cast member 10 providing a side plate 11 for the engine which also supports the right side crankshaft bearing 12 and also provides an elongated forwardly extending gear housing portion 13, a chain oil tank 14, and a mounting pad 15 to which a guide bar 16 may be secured by means of bolts 17 and a sprocket cover 18. A gear case cover 19 is provided with a gasket 20 and secured by screws 21 in complementary relationship to the gear case 10. The heads of the bolts 17 are trapped in recesses in the housing 13 and retained therein by the cover 19.

As previously noted, the driven member 22 of a centrifugal friction clutch is secured on the crankshaft 23, conveniently by means of a threaded joint of such hand that the clockwise rotation of the crankshaft tends to cause the crankshaft to screw itself into the clutch hub and secure the assembly without keying. In obtaining a secure engagement by these means the pulsating nature of the power delivery of a single cylinder engine is very nearly as effective as an impact wrench and a tight joint is achieved even though the initial assembly is only finger-tight.

The driven member 22 carries the usual centrifugally actuated clutch shoes 24 which, at a predetermined engine speed, engage and drive the clutch drum 25. Secured to the clutch drum by a brazed or other suitable joint is a pinion 26. The clutch drum and pinion are supported on the extension of the crankshaft 23 by a needle bearing 27, and a similar needle bearing 28 supports the crankshaft extension 23 in the gear case cover 19. The completeness of the bearing support afforded prevents the development of any strains on the crankshaft which might develop from the imposition of shock loads on the pinion in the absence of an outboard bearing support.

An intermediate direction reducing shaft 29 is supported by needle bearings 30 engaging the gear case 13 and gear case cover 19. This shaft is formed from what was originally hexagonal bar stock, and a centrally disposed portion is left at the original dimensions to provide a shoulder 31 having wrench engaging flats defined by the original bar stock. A reduced diameter portion 32 to either side of the shoulder 31 is threaded to receive the gears which are drawn up into engagement with the shoulder. In the example shown the engine shaft has a clockwise rotation and the driven gear 33 thus tends to rotate counter-clockwise. To insure that the gear 33 will be self-tightening on the shaft and will remain in engagement with the shoulder 31, the portion 32 should be provided with a right-hand thread. Similarly, the output or driving gear 34 on the intermediate shaft will be taking power from the shaft and will also be tending to rotate counter-clockwise. Here also a right-hand thread should be used so that the gear will be self-tightening and will remain tight.

Conveniently, the pinion 26 will have about 26 teeth and the gear 33 about 52 teeth, so that a 2–1 reduction will be affected in going from crankshaft to intermediate shaft. Again it will be noted that the shaft is supported in bearings at both ends avoiding the development of strains or distortion.

An output shaft 35 is similarly formed from hexagonal bar stock to leave a shoulder 36 providing wrench-engaging surfaces and is formed on its end with a square or splined drive portion 37 receiving a chain sprocket 38 of complemental form. A cap screw 39 and lock washer 40 secure the sprocket in place. The shaft 35 is likewise provided with dual support by suitable needle bearings 41 engaging the gear case 13 and gear case cover 19 and is provided with an oil retainer 42 to prevent the leakage of lubricant around the output shaft. For heavy duty applications a pair of needle thrust bearings 43 may be employed to control end play on the shaft, and for lighter duty thrust washers may be employed. The shaft 35 is threaded at 44 to receive a driven gear 45 which engages the driving gear 34 on the intermediate shaft. Since the gear 45 is, in this example, driven clockwise and itself drives the shaft 35, the threads should be right-hand threads so that the gear tends to draw itself under load into tighter engagement with a shoulder 46 formed by a reduction in the diameter of the shaft 35. In the example shown, the gear 34 has 28 teeth and the gear 45 has 50 teeth, so that the overall reduction achieved by the gear train is 3.6 to 1. When these same parts are used with an engine capable of delivering less torque, it is convenient to assemble the gear train with a final drive pair of 26 and 52 teeth so that the overall gear ratio is 4 to 1.

In the example shown, clearance is not available for an output gear of much more than 52 teeth but obviously any assembly giving lesser reductions may be used within the confines of the same gear clearance.

It occasionally develops that someone whose primary need is for a reduction drive chain saw will have an occasional need for a direct drive saw. The arrangement here provided permits the user to remove the gear case cover and by interchanging the gears 34 and 45 provide a step-up between the intermediate and final drive shafts without requiring the purchase of any additional parts. A direct drive saw provided in this way has the added advantage of a nearly centrally mounted guide bar with nearly ideal balance for use in bucking cuts.

Referring particularly to FIG. 2, it will be noted that an oil well is provided in the lowermost portion of the gear case 13 and gear case cover 19, and that the intermediate shaft 29 is sufficiently depressed below a plane including the crankshaft 23 and final drive shaft 35. Thus, only the large gear 33 on the intermediate shaft normally runs in the lubricant and by direct transmission and spraying distributes oil to the other gears and to the needle bearings.

As shown, the friction clutch functions in an oil-contaminated atmosphere, but the clutch does not itself run in oil and centrifugal force during operation and natural drainage during idle periods tends to remove any oil which may penetrate to the clutch shoes. Also, sufficient clearance has been provided to permit the use of a larger diameter clutch than might otherwise be regarded as necessary for an engine of the horsepower here employed. Obviously, if desired, a separate compartment may be provided to permit the clutch to function without contamination by oil, but we do not regard this advantage as sufficient to justify partitioning the gear case and providing the necessary additional oil seals.

Conveniently, the forward part of the gear casing which supports the mounting pad 15 may be partitioned off to provide an oil tank 47 in which there may be maintained a supply of oil for the lubrication of the saw chain. For convenience in operation, we prefer to provide a remotely positioned oil pump 48 actuated by a thumb button 49 on the main handle 50 and connected by flexible tubing 57 to a pickup fitting 52 which seeks the lowest level in the oil tank and by another tube 53 which delivers oil from the pump to an oil hole suitably positioned in the mounting pad 15 to deliver oil to the guide bar groove.

Reference may be made to the schematic drawings, FIGS. 5, 6, and 7, to illustrate the advantages of our preferred arrangement of gears. In this consideration it should be borne in mind that the interchangeability of most of the engine components with those to be used on direct drive saws requires that the engine have a clockwise rotation when viewed from the right hand end of the crankshaft and that the chain sprocket rotation must have a similar rotation. Reversal of the engine would be possible with minor changes of engine components if this offered any functional advantage but, as will be shown below, there are notable advantages in the use of an intermediate direction reversing shaft and in gear reduction in two approximately equal steps.

From the weight standpoint, an approximation can be obtained by assuming that each gear is a flat cylinder whose weight equals (density x (thickness) x (π) x (pitch radius squared). For comparative purposes we can assume density and thickness as unity, the desired gear ratio as four-to-one, and the pitch radius for the smallest pinion as one or just sufficient to clear the bearing diameter.

Then for a counter-clockwise engine rotation situation illustrated in FIG. 5, the pitch diameter of the small gear A equals 1 and that of the larger gear B equals 4 and weight$=(1^2+4^2)=17$.

For the clockwise rotation situation with an intermediate idler necessary to reverse the direction of rotation to provide a clockwise output, reference may be made to FIG. 6 where, as above, the pitch diameter of the small gear A equals 1, that of the idler C equals 1, and that of the large gear B equals 4 and $$\text{Weight}=(1^2+1^2+4^2)=18$$

FIG. 7 illustrates the advantage of two-step reduction where the pitch diameter of the small gear equals 1, that of the intermediate gear D equals 2, that of intermediate gear E equals 1, and that of final drive gear F equals 2 for the same four-to-one reduction and Weight$=(1^2+2^2+1^2+2^2)=10$.

The advantage in terms of weight and reduction of mass in the rotating system is almost two-fold, and a low pleasing contour can be attained which blends nicely with the low streamlined form of the chain saw illustrated in the design patent above referred to.

Obviously reasonable variations in overall gear ratio may be effected by the selection of ratios of the two individual steps and we do not consider our invention as being limited to the exact embodiment here disclosed. For an exact definition of the limits upon our invention, reference may be made to the appended claims.

We claim:

1. In a transmission for a chain saw, a multi-step reduction gear train comprising at least one intermediate shaft supported at its ends by bearings, an enlarged diameter section intermediate the ends of said shaft, a threaded section of said shaft on each side of said enlarged section, a driven gear threadably received on one of said threaded sections in abutment with said enlarged section and a driving gear threadably received on the other of said threaded sections, the hand of said threads being so selected that the forces applied to the driven gear and the forces applied by said shaft to the driving gear tend to produce relative rotation of said gears tending to draw said gears into closure abutment with said enlarged section of the shaft, the enlarged section of said shaft being provided with wrench-engaging surfaces to facilitate disassembly of said gear from said shaft.

2. A transmission for a reduction gear drive chain saw, comprising a plurality of toothed interengaging gear members each received on a shaft member, an enlarged section of each shaft against which said gear members abut, some of said enlarged sections being formed to define wrench-engaging surfaces, and interengaging threaded surfaces on said gear members and said shafts, the hand of said threads being so selected that the forces applied to the driven gear members of said train and the forces applied by said shafts to the driving gear members of said train tend to rotate said gear members into closure abutment with the enlarged sections of the shaft members.

3. A transmission for a reduction gear drive chain saw of minimum height and low compact profile, comprising a gear case, a power driven shaft having a pinion rigidly mounted thereon, an intermediate shaft having a driven gear mounted on one end thereof in intermeshing relationship with said pinion, a driving gear mounted on the other end of said intermediate shaft having approximately the same diameter as said pinion, an output shaft having a second driven gear mounted on one end thereon in intermeshing relationship with said driving gear, a driven sprocket mounted on the other end of said output shaft, said first and second driven gears having approximately the same pitch diameters whereby the speed is reduced in two approximately equal steps so that a minimum amount of gear space and gear mass is required for a desired speed reduction, a lubricant in the lower portion of said gear case when said chain saw is in its normal operating position, mounting means for said intermediate shaft so depressed from a plane which includes the axes of the pinion and the output shaft that when said plane is in its normal horizontal position, only one of the gears on the intermediate shaft runs in said lubricant, the gear on said output shaft and its meshing gear on said intermediate shaft being interchangeable so that a reduction drive saw may, at the choice of the operator, be assembled with the gears arranged for substantially a 1-to-1 ratio.

References Cited in the file of this patent
UNITED STATES PATENTS

| | | |
|---|---|---|
| 1,144,137 | Kennedy | June 22, 1915 |
| 2,079,730 | Blair | May 11, 1937 |
| 2,327,233 | Wolf | Aug. 17, 1943 |
| 2,566,253 | Schmitter | Aug. 28, 1951 |
| 2,709,923 | Manning | June 7, 1955 |
| 2,925,293 | Voss et al. | Feb. 16, 1960 |
| 3,015,966 | Howard | Jan. 9, 1962 |